United States Patent
Yanska et al.

(10) Patent No.: US 10,024,350 B2
(45) Date of Patent: Jul. 17, 2018

(54) SEAL SYSTEM FOR DRY LUBE PIN JOINTS

(71) Applicant: Caterpillar Inc., Peoria, IL (US)

(72) Inventors: David J. Yanska, Peoria, IL (US);
Aaron Kenneth Amstutz, Peoria, IL (US); Sunil I Mathew, Peoria, IL (US);
Darren B. Antoine, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 113 days.

(21) Appl. No.: 15/001,350

(22) Filed: Jan. 20, 2016

(65) Prior Publication Data
US 2017/0204892 A1 Jul. 20, 2017

(51) Int. Cl.
| F16J 15/20 | (2006.01) |
| F16B 19/00 | (2006.01) |
| F16J 15/18 | (2006.01) |
| E02F 9/00 | (2006.01) |
| F16C 33/74 | (2006.01) |
| F16J 15/16 | (2006.01) |
| F16C 11/04 | (2006.01) |

(52) U.S. Cl.
CPC ............ *F16B 19/008* (2013.01); *E02F 9/006* (2013.01); *F16C 11/045* (2013.01); *F16C 33/74* (2013.01); *F16J 15/16* (2013.01); *F16J 15/182* (2013.01)

(58) Field of Classification Search
CPC ....... F16B 19/008; E02F 9/006; F16C 11/045; F16C 33/74; F16J 15/16; F16J 15/182; B62D 55/211; B62D 55/0887; B62D 55/15; B62D 55/104
USPC .......................................................... 277/540
See application file for complete search history.

(56) References Cited

U.S. PATENT DOCUMENTS

| 2,911,840 | A | * | 11/1959 | Muller | ............... | B62D 55/0887 |
| | | | | | | 277/500 |
| 3,680,924 | A | * | 8/1972 | Otto | .................... | B62D 55/0887 |
| | | | | | | 305/102 |
| 4,165,085 | A | | 8/1979 | Persson | | |
| 4,306,728 | A | * | 12/1981 | Huperz | .................. | F16J 15/186 |
| | | | | | | 277/536 |
| 4,428,590 | A | * | 1/1984 | Pippert | .................. | F16J 15/166 |
| | | | | | | 277/638 |
| 5,380,016 | A | | 1/1995 | Reinsma et al. | | |
| 5,490,730 | A | | 2/1996 | Akita et al. | | |
| 6,045,137 | A | | 4/2000 | Friend et al. | | |
| 6,783,129 | B2 | | 8/2004 | Akita et al. | | |
| 6,988,733 | B2 | | 1/2006 | Hatch | | |
| 7,367,739 | B2 | | 5/2008 | Brock et al. | | |
| 7,946,592 | B2 | | 5/2011 | Yamamoto et al. | | |

(Continued)

FOREIGN PATENT DOCUMENTS

JP 2008057626 3/2008

*Primary Examiner* — Nathan Cumar
(74) *Attorney, Agent, or Firm* — Law Office of Kurt J. Fugman LLC (57) ABSTRACT

A pin connection for a machine is provided that comprises a structural member that defines a pin receiving bore, a bearing housing that defines a bearing receiving bore, a self-lubricating bearing that defines a pin receiving bore, and a pin that is disposed in the bores of the bearing and the structural member. The pin connection may further comprise a seal assembly that is disposed in the bearing receiving bore of the bearing housing, the seal assembly comprising a micro-cellular closed cell foam member and a first rigid member.

5 Claims, 5 Drawing Sheets

(56) References Cited

U.S. PATENT DOCUMENTS

| | | |
|---|---|---|
| 8,596,870 B2 | 12/2013 | Akita et al. |
| 2006/0006605 A1* | 1/2006 | Grimanis ............. F16J 15/3224 |
| | | 277/500 |
| 2006/0093246 A1* | 5/2006 | Akita ..................... E02F 9/006 |
| | | 384/279 |
| 2006/0290068 A1 | 12/2006 | Berdichevsky et al. |
| 2011/0290812 A1* | 12/2011 | Garver .................... F16J 15/56 |
| | | 220/669 |
| 2011/0293360 A1* | 12/2011 | Becker ................. F16C 11/045 |
| | | 403/161 |
| 2012/0286477 A1 | 11/2012 | Klousia et al. |
| 2015/0211194 A1 | 7/2015 | Petersen |
| 2015/0300498 A1* | 10/2015 | Jensen .................. F16J 15/344 |
| | | 305/104 |

\* cited by examiner

SEAL SYSTEM FOR DRY LUBE PIN JOINTS

TECHNICAL FIELD

The present disclosure relates generally to a pin joint for machinery. More specifically, the present disclosure relates to seal systems for a pin joint of machinery such as construction equipment, excavating equipment, and the like.

BACKGROUND

Pin joints for machinery generally fall into two categories. Dynamic joints where structural members move relative to each other and static joints where the structural members do not move. When dynamic joints are present, they may move back and forth making oscillatory motion. In some instances, this can create friction and wear that may limit the life of the pin joint. Consequently, the art has developed schemes to limit this friction and prolong the life of the pin joint.

Self-lubricating bearings have been developed to eliminate the need for wet lubricant in the pin joints, however there are no reliable sealing systems available to protect these bearings. Grease lip seals that comprise a steel can or backbone that supports a single urethane lip to protect the pin-to-bearing interface have also been developed. However, these seals are not designed for performance and long life in the absence of a lubricant. This may lead to failure of the pin joint and unplanned downtime of the machine.

Therefore, it is desirable to develop a better seal system for use with self-lubricating bearings in a dynamic pin joint for machinery.

SUMMARY OF THE DISCLOSURE

A seal assembly is provided that may comprise a closed-cell foam member and a thrust washer that extends from the foam member and that comprises a rigid material.

A seal assembly is provided that may comprise an outer rigid member, an inner rigid member, and a closed-cell foam member that is interposed between the inner and outer rigid members.

A pin connection for a machine is provided that comprises a structural member that defines a pin receiving bore, a bearing housing that defines a bearing receiving bore, a self-lubricating bearing that defines a pin receiving bore, and a pin that is disposed in the bores of the bearing and the structural member. The pin connection may further comprise a seal assembly that is disposed in the bearing receiving bore of the bearing housing, the seal assembly comprising a micro-cellular closed cell foam member and a first rigid member.

DETAILED DESCRIPTION

Figure 1:
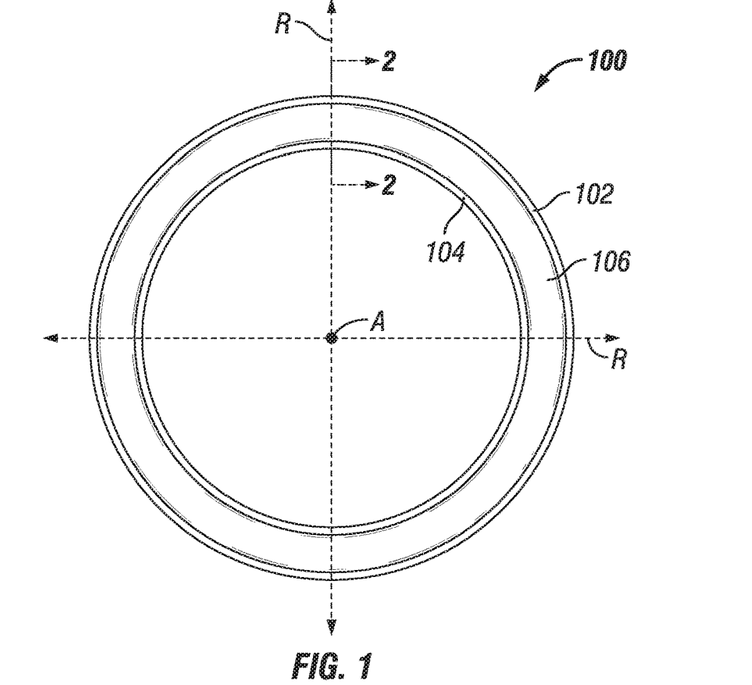
FIG. 1 is a front view of a seal assembly according to one embodiment of the present disclosure that includes inner and outer rigid members that sandwich a foam member.

Focusing now on FIG. 1, a seal assembly 100 according to one embodiment of the present disclosure is illustrated that comprises an outer rigid member 102, an inner rigid member 104, and a foam member 106 that is positioned radially or is otherwise interposed between the inner and outer rigid members 104, 102. The foam member 106 may be made of any type of closed-cell foam such as a microcellular polyurethane elastomer. The rigid members 102, 104 may comprise fiber reinforced PTFE or another rigid material such as nylon. In use as will be illustrated more clearly later herein, the foam member 106 is compressed between the first and second rigid members 102, 104 but may still be movable relative to these rigid members. That is to say, the foam member 106 is not necessarily bonded to the inner and outer rigid members 102, 104.

Other examples of rigid materials that could be uses for the rigid members 104, 102 include glass-filled PTFE, unfilled PTFE, lubricated Nylon (PA), POM (Polyoxymethylene), PEEK, PAI, PPS, PI, PPA, fiberglass composite, carbon-fiber composite, steel, bronze, A-DLC coated steel, boron-aluminum-magnesium coated steel, chrome nitride coated steel, rigid polyurethane, oil-impregnated powdered metal, etc. In some cases, the material may also be a self-lubricating material but not necessarily so. Any suitably rigid material may be used that facilitates the creation of a suitable seal.

Figure 2:
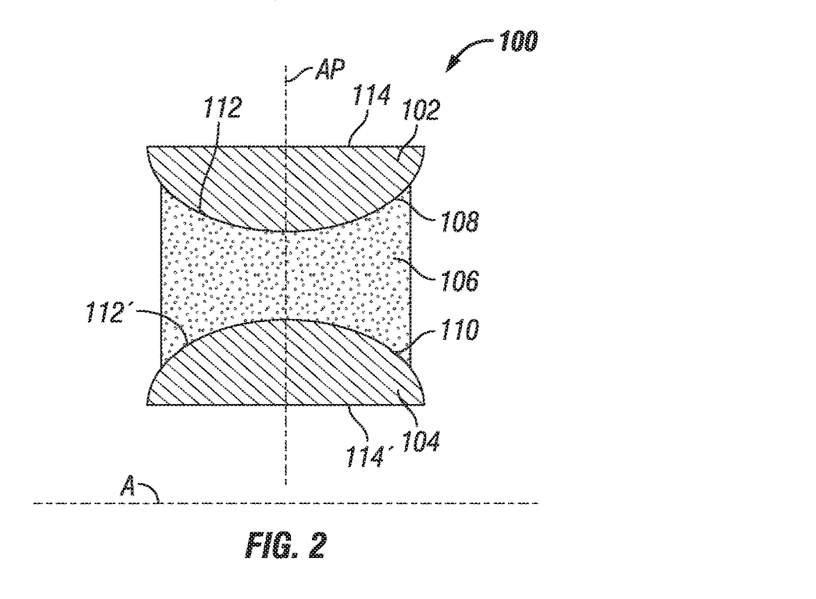
FIG. 2 is a cross-sectional view of the seal assembly of FIG. 1 taken along lines 2-2 thereof.

Turning now to FIG. 2, the foam member 106 defines a first recess 108 that is configured to receive the first rigid member 102 and further defines a second recess 110 that is configured to receive the second rigid member 104. In this embodiment, the entire assembly is symmetrical about radial planes through radial directions R (see FIG. 1) and an radial plane AP that is centered with respect to the assembly along the longitudinal axis A of the seal assembly 100 and is perpendicular to that axis (see FIG. 2). In general, the seal assembly 100 has a generally annular shape that is formed by rotating the cross-section of FIG. 2 about the longitudinal axis A. Other configurations such as those that are not symmetrical are also possible.

As shown in FIG. 2, the recesses 108, 110 are complimentary shaped to the inner surfaces 112 of the inner and outer rigid members 102, 104 and provide undercuts in the direction along the longitudinal axis A, preventing the foam member 106 and rigid members 102, 104 from being separated from each other once assembled. A curved interface is shown but other interfaces are possible such as those discussed later herein with respect to the other embodiments. The curved inner surface 112 of each of the rigid members 102, 104 terminates in a cylindrical outer surface 114 that mates with structural components of the pin joint or pin connection as will be described later herein. The shapes of these surfaces may be varied as desired or needed. The foam member 106 is slightly recessed relative to the rigid members 102, 104 along the longitudinal axis A, helping to protect the foam member 106 from the movement of structural members and bearing as frequently occur in pin connections.

Figure 3:
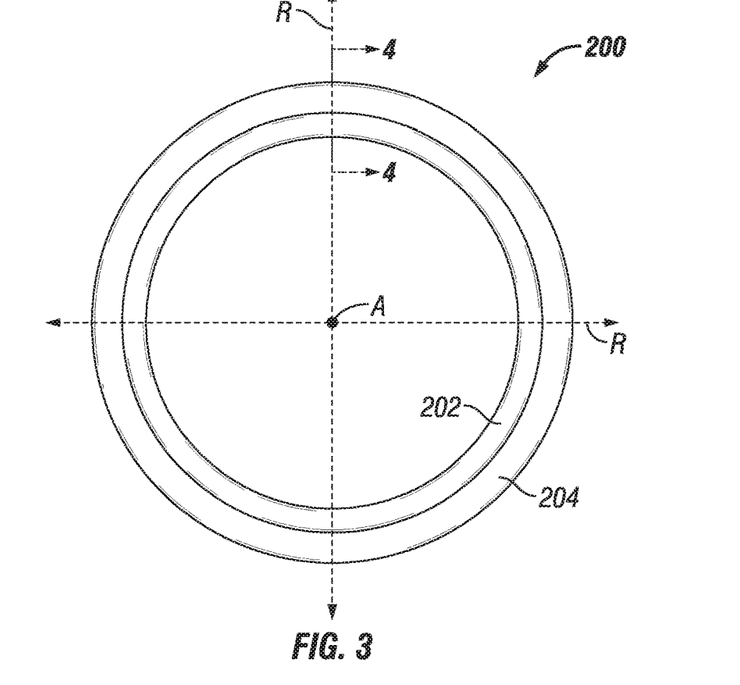
FIG. 3 is a front view of a seal assembly according to another embodiment of the present disclosure that includes a foam member and a rigid member that extends from the foam member.

A seal assembly 200 according to another embodiment of the present disclosure is shown in FIG. 3. The seal assembly 200 defines a radial direction and a longitudinal axis. The seal assembly 200 comprises a foam member 202 and a thrust washer 204 that extends from the foam member 202 in the radial direction and the foam member is at least partially positioned between the thrust washer and the longitudinal axis along the radial direction. The thrust washer 204 may also be considered a rigid member as it may comprise a rigid material such as a fiberglass and epoxy composite.

Other examples of rigid materials that could be uses for the thrust washer 204 include glass-filled PTFE, unfilled PTFE, lubricated Nylon (PA), POM (Polyoxymethylene), PEEK, PAI, PPS, PI, PPA, fiberglass composite, carbon-fiber composite, steel, bronze, A-DLC coated steel, boron-aluminum-magnesium coated steel, chrome nitride coated steel, rigid polyurethane, oil-impregnated powdered metal, etc. In some cases, the material may also be a self-lubricating material but not necessarily so. Any suitably rigid material may be used that facilitates the creation of a suitable seal.

Figure 4:
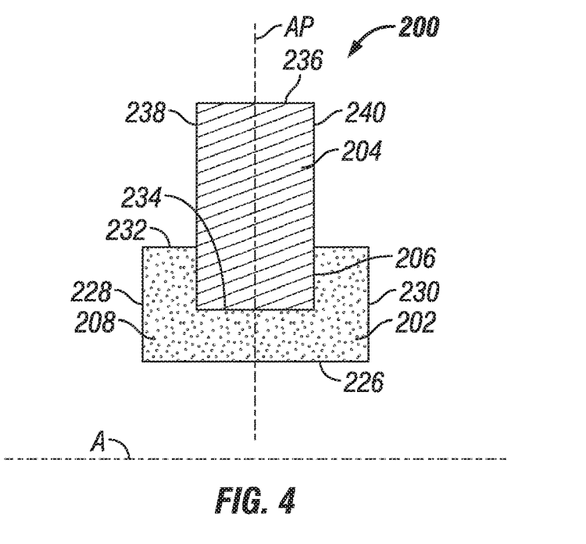
FIG. 4 is a cross-sectional view of the seal assembly of FIG. 3 taken along lines 4-4 thereof.

Turning now to FIG. 4, the foam member 202 defines a first recess 206 that is configured to receive the thrust washer 204. In this embodiment, the entire assembly 200 is symmetrical about radial planes through radial directions R (see FIG. 3) and an radial plane AP that is centered with respect to the assembly 200 along the longitudinal axis A of the seal assembly 200 (see FIG. 4). In general, the seal assembly 200 has a generally annular shape that is formed by rotating the cross-section of FIG. 4 about the longitudinal axis A. Other configurations such as those that are not symmetrical are also possible. For this embodiment, the recess 206 is rectangularly shaped and may be formed by overmolding the foam member 202 upon the thrust washer 204. Or, the two components may be bonded together. This may not be the case if the components are manually assembled.

Figure 5:
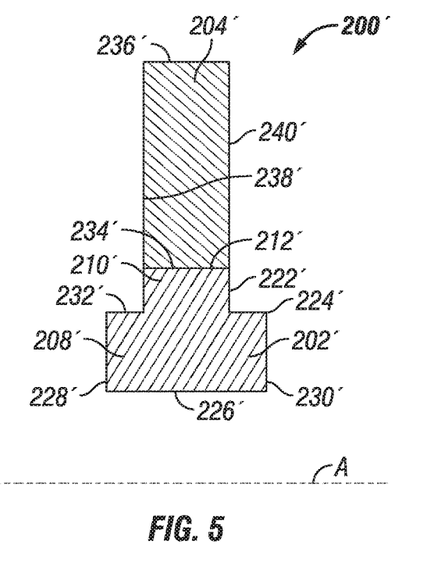
FIG. 5 is an alternate construction of the seal assembly of FIG. 4 showing the provision of a shelf.
Figure 6:
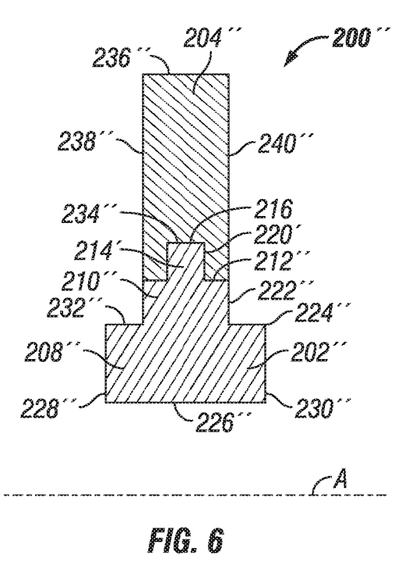
FIG. 6 is an alternate construction of the seal assembly of FIG. 4 showing the provision of a shelf and a protrusion that includes a flat free end.
Figure 7:
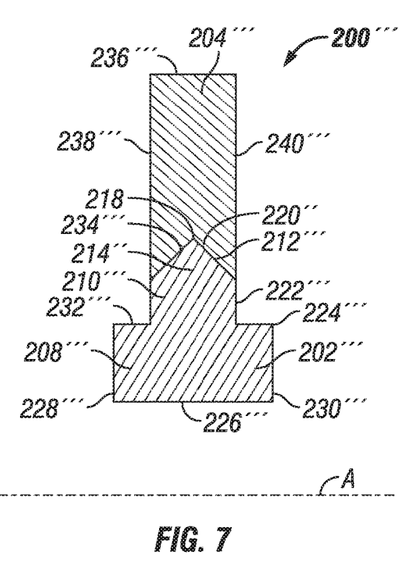
FIG. 7 is an alternate construction of the seal assembly of FIG. 4 showing the provision of a shelf and a protrusion that includes a pointed free end.

Looking now at FIGS. 5 thru 7, various other constructions of seal assemblies 200', 200", 200'" similar to that disclosed in FIGS. 3 and 4 can be seen in cross-section. For these embodiments, the foam member 202', 202", 202'" lacks a recess for receiving the thrust washer but instead comprises a compression portion 208', 208", 208'" and a connection portion 210', 210", 210'". The compression portion 208', 208", 208'" is suitable for being compressed between structural members and a bearing while the connection portions 210', 210", 210'" extend from the compression portion 208', 208", 208'" and provide a bonding interface 212', 212", 212'" with the thrust washer 204', 204", 204'". For the embodiments shown in FIGS. 5 thru 7, there is no bonding between the foam member and the thrust washer.

In FIG. 5, this interface 212' is a cylindrical surface. In FIG. 6, this interface 212" includes a protrusion 214' that extends form the connecting portion 210" and that has a rectangular shape with a cylindrical free end 216. In FIG. 7, this interface 212'" includes a protrusion 214" that extends form the connecting portion 210'" and has a pointed circular free end 218. At the bonding interface 212'", the thrust washer 204'" may be complimentary shaped to mate with the connecting portion 210'". When a protrusion 214', 214" is present, the thrust washer 204", 204'" may define a recess 220', 220" that is configured to accept the protrusion 214', 214".

FIGS. 5 thru 7 also show that a shelf 222', 222", 222'" is created by having a connecting portion 210', 210", 210'" that extends from the compression portion 208', 208", 208'" for the foam member 202', 202", 202'". As a result, forces exerted laterally along the longitudinal axis A of the seal assembly 200', 200", 200'" are borne solely by the thrust washer 204', 204", 204'", helping to prevent the shearing of the foam member 202', 202", 202'". This is true as the shelf 222', 222", 222'" is spaced away from the axial extremities 224', 224", 224'" of the compression portion 208', 208", 208'" along the longitudinal axis A. As a result, the connecting portion does not contact a structural member or bearing of the pin connection. This will become clearer when the pin connection itself is discussed later herein with respect to FIG. 9.

As shown in FIGS. 4 thru 7, the foam member 202, 202', 202", 202'" forms compression surfaces that are intended to contact various components of the pin connection. The inner compression surface 226, 226', 226", 226'" is cylindrically shaped and the left and right compression surfaces 228, 228', 228", 228'"; 230, 230', 230", 230'" are annularly shaped. The compression portion 208, 208', 208", 208'" also has an outer compression surface 232, 232', 232", 232'" that is cylindrically shaped. The thrust washer 204, 204', 204", 204'" for FIGS. 4 thru 7 include an interface surface 234, 234', 234", 234'", a radially outer surface 236, 236', 236", 236'" that is cylindrically shaped and left and right thrust surfaces 238, 238', 238", 238'"; 240, 240', 240", 240'" that are annularly shaped for contacting various parts of the pin connection.

INDUSTRIAL APPLICABILITY

The seal assemblies are suitable for use with pin connections or joints such as those used for moving booms and sticks or track assemblies as are used on construction or excavating machinery and the like although other types of machines may benefit from these pin connections as well.

Figure 8:
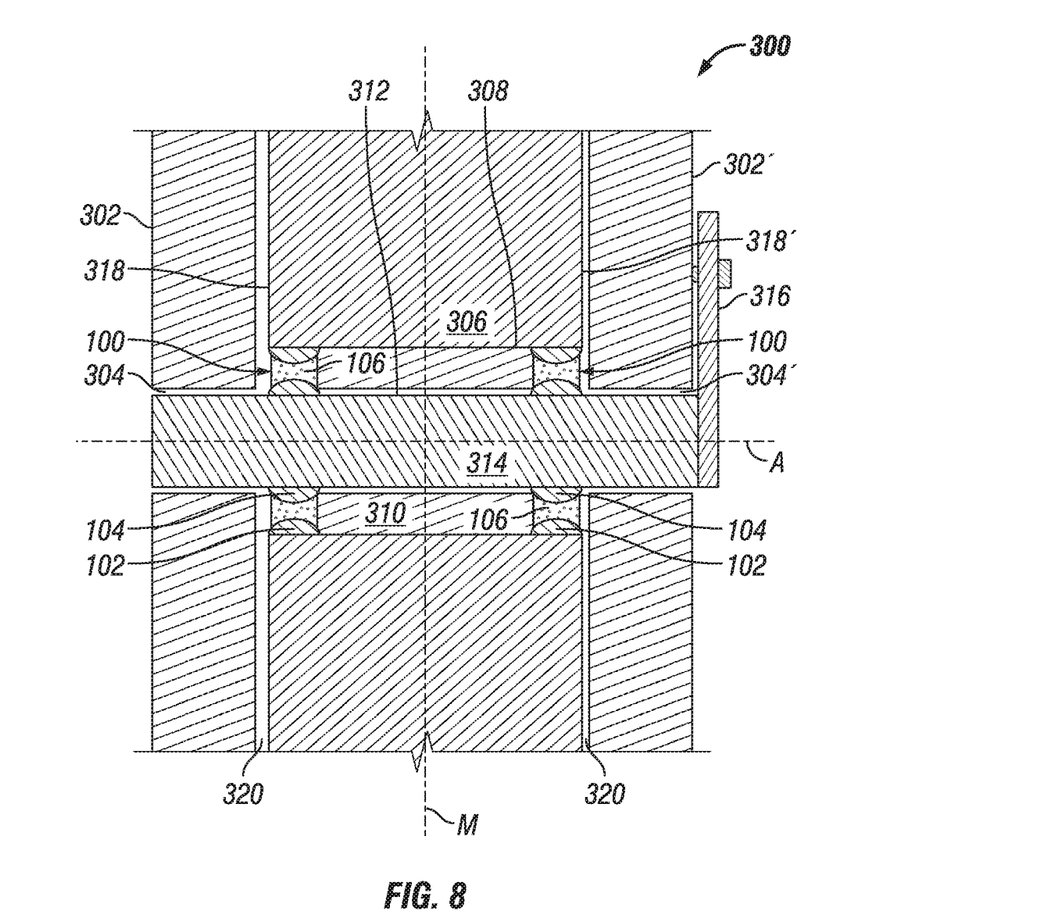
FIG. 8 is a cross-sectional view of a pin connection for a machine that uses the seal assembly of FIGS. 1 and 2.

FIG. 8 depicts such a pin connection 300 for a machine. The pin connection 300 comprises a structural member 302 that defines a pin receiving bore 304, a bearing housing 306 that defines a bearing receiving bore 308, a self-lubricating bearing 310 that defines a pin receiving bore 312, a pin 314 that is disposed in the bores of the bearing and the structural member, and a seal assembly 100 that is disposed in the bearing receiving bore 308 of the bearing housing 306. The seal assembly 100 comprises a micro-cellular closed-cell foam member 106 and first and second rigid members 104, 102. As shown, the seal assembly 100 is similar to that disclosed by FIGS. 1 and 2 meaning that the foam member 106 is positioned between the first and second rigid members 104, 102.

More particularly, the first rigid member is an inner member 104 that is press fit about the pin 314 and the second rigid member 102 is press fit into the bearing receiving bore 308 and contacts the bearing housing 306. A press fit may be provided on a side to hold the seal assembly 100 in position. Alternatively, there may be a slip fit between inner diameter of the inner rigid member and the pin while a press fit may be present between the outer diameter of the outer rigid member and the bearing housing. When a press fit is present for the inner diameter of the inner rigid member, there may be movement between the foam and the inner and outer rigid members assuming that there is no bonding between these various components.

As shown, the pin connection 300 is symmetrical about a midplane M. Hence, two structural members 302, 302' and seal assemblies 100, 100' are found on either side of the midplane M. This may not be true for other embodiments. A flag plate 316 is provided that is fixedly attached to a structural member 302' and the pin 314, helping to prevent any movement of the pin. The fixed attachment of the flag plate 316 to the pin may be achieved using welding while the fixed attachment of the plate to the structural member may be achieved via a fastener (not shown). Other methods of retaining the pin and preventing rotation of the pin are possible. Other embodiments are contemplated wherein there is some movement of the pin 314 during rotation of the pin connection 300. In still further embodiments, the rigid members 102, 104 of the seal assembly 100 and the self-lubricating bearing 310 may be made from the same material.

For this embodiment, the structural member 302 is fixed and the bearing housing 306 is movable relative to the structural member. The opposite may be true for other embodiments. Also, the seal assemblies 100, 100' are flush or recessed compared to the sidewalls 318 of the bearing housing 306 along the longitudinal axis A, helping to protect the seal assemblies 100, 100' from damage. Debris, water, dirt etc. is inhibited from entering the pin receiving bore 312 of the bearing 310 and the bearing receiving bore 308 of the bearing housing 306, helping to prolong the life of the pin connection 300 without requiring maintenance. However, there is little to prevent the bearing housing 306 and the structural members 302 from rubbing against each other during movement of the pin connection 300.

Figure 9:
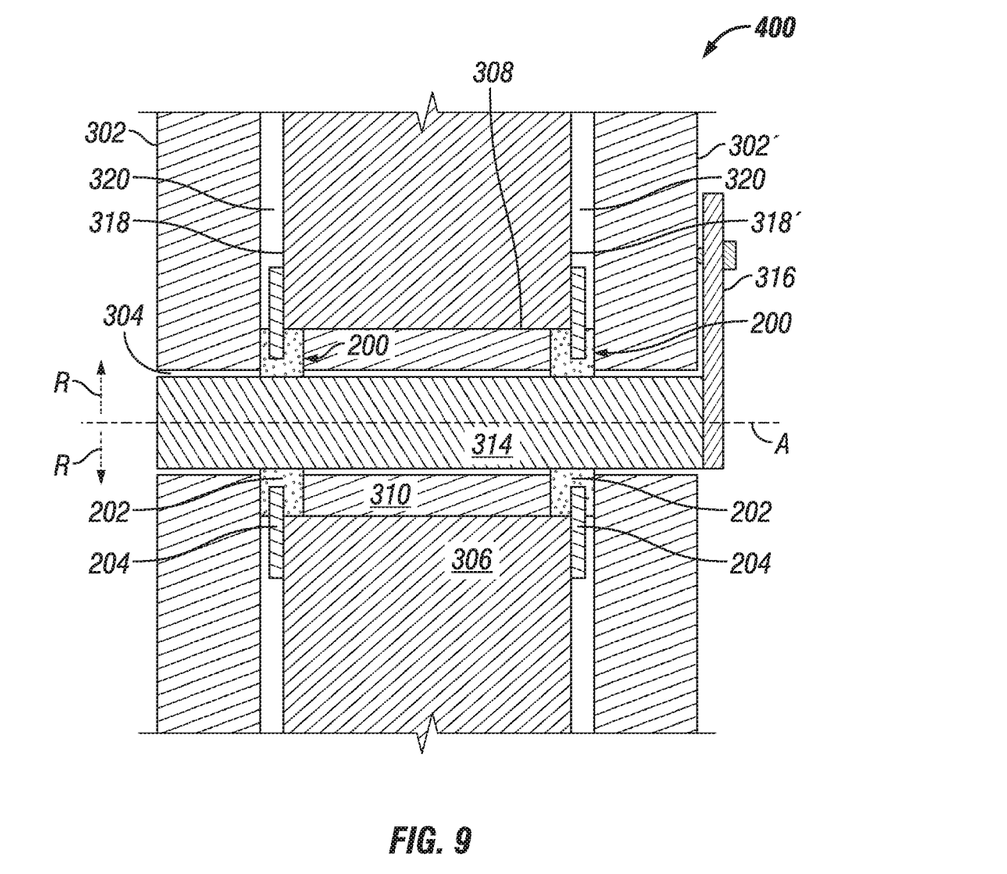
FIG. 9 is a cross-sectional view of a pin connection for a machine that uses the seal assembly of FIGS. 3 and 4.

To prevent this, a pin connection 400 such as that shown by FIG. 9 may be provided. This pin connection 400 is constructed similarly to that just described with reference to FIG. 8 except for the following differences. Instead of the seal assembly of FIGS. 1 and 2 being used, a seal assembly 200 such as that shown in FIGS. 3 thru 7 is used. With this embodiment, the foam member 202 is installed between the structural member 302 and the bearing 310. More particularly, the pin 314 defines a longitudinal axis A and a radial direction R and the foam member 202 is primarily compressed radially, but may also be compressed axially along the longitudinal axis A between the structural member 302 and the bearing 310.

Moreover, a single rigid member is provided that acts as a thrust washer 204 that is connected to the foam member 202 and that extends between the bearing housing 306 and structural member 302. This helps to prevent any contact between a moving member and a stationary member that could cause noise or galling, etc. The foam member 202 is also compressed radially between the bearing housing 306 and the pin 314. Again, debris, water, dirt, etc. is inhibited from entering the pin receiving bore 312 of the bearing 310 and the bearing receiving bore 308 of the bearing housing 306, helping to prolong the life of the pin connection 400 without requiring maintenance. More particularly, debris cannot effectively infiltrate the areas surrounding or internal to the bearing 310 by passing through the pin bore 304 of the structural member 302 and the clearance 320 found between the bearing housing 306 and the structural member 302. In still further embodiments, the thrust washer 204 of the seal assembly 200 and the self-lubricating bearing 310 may be made from the same material.

While most of the embodiments discussed herein are dry lube applications, systems that provide or have a liquid lubricant such as oil may in certain circumstances be compatible with the seal assemblies discussed herein and are therefore within the scope of the present disclosure. In addition, it is contemplated that features from the seal assembly of FIG. 3 may be added to the seal assembly of FIG. 1 such as providing a thrust washer that extends from the outer rigid member 102 to provide a cushion between the structural member and the bearing housing.

It will be appreciated that the foregoing description provides examples of the disclosed design and function. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A seal assembly comprising:
a radially outer rigid member;
a radially inner rigid member; and
a closed-cell foam member that is interposed between and coaxially aligned with the radially inner and radially outer rigid members, wherein the closed-cell foam member includes a first recess formed in a radially outer peripheral surface of the closed-cell foam member and a second recess formed in a radially inner peripheral surface of the closed-cell foam member with the radially outer rigid member received in the first recess and the radially inner rigid member received in the second recess, and an axial length of the closed-cell foam member being shorter than an axial length of each of the radially outer rigid member and the radially inner rigid member such that the radially outer rigid member and the radially inner rigid member extend axially beyond axially opposite ends of the closed-cell foam member.

2. The seal assembly of claim 1 wherein the rigid members comprise fiber reinforced PTFE.

3. The seal assembly of claim 1 wherein the foam member is compressed between the first and second rigid members.

4. The seal assembly of claim 1 wherein the foam member is movable relative to the inner and outer rigid members.

5. The seal assembly of claim 1 wherein the first recess defines a convex profile that is configured to receive the first rigid member and the second recess defines a convex profile that is configured to receive the second rigid member.

\* \* \* \* \*